United States Patent
Wauke et al.

(10) Patent No.: US 6,369,979 B1
(45) Date of Patent: Apr. 9, 2002

(54) DISK DEVICE

(75) Inventors: Tomokuni Wauke; Mutsumi Ito, both of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/322,834

(22) Filed: May 28, 1999

(30) Foreign Application Priority Data

Jun. 8, 1998 (JP) .......................................... 10-158973

(51) Int. Cl.[7] .............................................. G11B 17/04
(52) U.S. Cl. .................................................. 360/99.02
(58) Field of Search .......................... 360/99.02, 99.03, 360/99.06, 99.07, 99.01; 369/77.1, 77.2, 75.1, 75.2

(56) References Cited

U.S. PATENT DOCUMENTS

| 4,831,477 | A | | 5/1989 | Sakamoto et al. ........ 360/99.06 |
| 5,663,852 | A | * | 9/1997 | Fujimori et al. ......... 360/99.12 |
| 5,699,210 | A | * | 12/1997 | Thompson et al. ...... 360/99.06 |
| 5,717,542 | A | * | 2/1998 | Yokota et al. ........... 360/99.06 |
| 5,862,012 | A | * | 1/1999 | Tsuchiya ................. 360/99.02 |
| 5,917,795 | A | * | 6/1999 | Furukawa et al. ......... 369/77.2 |
| 5,956,206 | A | * | 9/1999 | Kabasawa et al. ....... 360/99.06 |
| 6,055,124 | A | * | 4/2000 | Habara et al. ........... 360/99.02 |
| 6,151,190 | A | * | 11/2000 | Yamamoto et al. ...... 360/99.06 |
| 6,172,845 | B1 | * | 1/2001 | Tatehata et al. ......... 360/99.02 |
| 6,239,946 | B1 | * | 5/2001 | Wauke .................... 360/99.06 |
| 6,266,209 | B1 | * | 7/2001 | Kawakami ............... 360/99.06 |

FOREIGN PATENT DOCUMENTS

JP          2000348415      * 12/2000

* cited by examiner

Primary Examiner—David L. Ometz
Assistant Examiner—Tianjie Chen
(74) Attorney, Agent, or Firm—Brinks Hofer Gilson & Lione

(57) ABSTRACT

Disclosed is a disk device in which slide pieces slidable along an edge portion of a slide hole formed in a chassis are formed at the central part of both ends of a holder. The forward end of either of the slide pieces has a straight surface formed on the edge portion 2a side; and an inclined portion is formed by obliquely cutting the surface of the edge portion 2b side. When the disk case M inserted reaches a predetermined position, the holder slides within the slide hole of the chassis. In this case, the holder lowers while the inclined portion of the slide piece slides along the edge portion, enabling a decrease in the lowering speed of the holder to thereby reduce the lowering speed of the head descending into contact with the disk D.

3 Claims, 6 Drawing Sheets

DISK DEVICE

BACKGROUND OF THE INVENTION

1. Field of the Invention

The present invention relates to a disk device for recording and reproducing such as a floppy disk and, more particularly, to a disk device which reduces an impact likely to occur when a magnetic head contacts the disk during loading.

2. Description of Related Art

FIG. 10 is a side view showing a disk device 50 for a floppy disk.

The disk device 50 has a chassis 51, a slide plate 52, and a holder 53. On the chassis 51 is mounted the slide plate 52, which is movable in a longitudinal direction (in a lateral direction in FIG. 10). The slide plate 52 is provided with a holder 53 in which a disk case containing the floppy disk is inserted. The slide plate 52 and the holder 53 are connected by means of a coil spring 56, by which the slide plate 52 is constantly pushed to the left in the drawing.

The slide plate 52 has slide grooves 58a and 58b cut out obliquely in the front and rear portions of the side wall, and projections 55a and 55b formed on the side of the holder 53 slide in engagement with the slide grooves 58a and 58b.

In the disk device 50 stated above, the slide plate 52 is moved and locked in the right position with the holder 53 in the upper position as shown in FIG. 10. The disk case, when inserted in the direction of the arrow 23 in the drawing, is received by the holder 53. At this time the slide plate 52 is unlocked, and is moved to the left in the drawing by the force of the coil spring 56; accordingly the holder 53 goes downwardly with the projections 55a and 55b sliding in the slide grooves 58a and 58b (same also on the opposite side). At this time, the disk D in the disk case first contacts a magnetic head 54b on the side 0 side, and thereafter a magnetic head 54a on the side 1 side goes downwardly. Thus the disk D is held between the magnetic head 54a and the magnetic head 54b. In this state, data read/write operation is done while the disk D is turning.

To take out the disk case a button 57 is depressed to allow rightward movement of the slide plate 52. The holder 53 rises and the disk case is pushed out for discharge by a discharge member not shown.

In the disk device 50, however, the disk D is likely to get damaged when contacting the magnetic head.

When the disk case is inserted into the disk device 50 until it is held by the holder 53, and is lowered, the disk D in the disk case first contacts the magnetic head 54b on the side 0 side, and thereafter the magnetic head 54a on the side 1 side is lowered until it contacts the disk D. To the magnetic head 54a on the side 1 a spring force is constantly applied to press the magnetic head 54a towards the disk D side. With the insertion of the disk D, the magnetic head 54a thus being pressed comes into a collision with the disk D. That is, the magnetic head 54a collides against the disk D due to the force of the coil spring 56, producing an impactive force with which the disk D is likely to be impaired and accordingly resulting in a failure of data recording and reproduction.

The holder 53 is vertically guided. However, since the coil spring 56 is applying a horizontal force to the slide plate 52, the frictional force in the guide portion increases. Therefore when the disk case is taken out, a great force is needed to push out the button 57 and further there is such an inconvenience that the disk case can not be ejected out if the button 58 is not pushed in to some depth.

SUMMARY OF THE INVENTION

In view of the above-described inconvenience, therefore, it is an object of the present invention to provide a disk device which facilitates ejection of the disk case without giving damage to the disk even when the disk inserted contacts the magnetic head.

The disk device of the present invention has a chassis, a holder which moves between a first position where the disk case is received and a second position where the disk in the disk case thus received is set in the rotation drive section, a magnetic head which contacts the disk when the holder has moved as far as the second position, a forcing member for moving the holder towards the second position, and an ejecting member for driving the holder from the second position back towards the first position. In the disk device, a frictional mechanism is interposed between the holder side and the chassis side, for increasing a load for movement when the holder is moved towards the second position.

Adopting the above-described means can decrease the speed of movement of the holder to the second position by applying a load in a different direction of movement of the holder and also decrease the speed of movement of the head when the disk case is inserted into the holder and then the holder moves to the second position. As a result, an impact can be reduced when the magnetic head contacts the magnetic disk surface of the disk case.

In this case, it is desirable that a slide piece be provided as the frictional mechanism, on one of the holder side and the chassis side, with an inclined portion tapered in the direction A in which both sides are oppositely placed, and, on the other side, a counterpart portion on which the slide piece slides, and that the inclined portion slide on the counterpart portion when the holder moves towards the second position.

Because of the constitution of the aforesaid means and the provision of the counterpart portion, e.g., a sliding hole on the chassis side, the inclined portion of the slide piece provided on the holder side slides along the sliding hole when the holder moves to the second position. At this time, a frictional force occurs due to the sliding of the inclined surface on the edge portion of the sliding hole. The frictional force reduces the speed of the holder moving from the first position to the second position, thereby diminishing an impact resulting from the contact of the head with the magnetic disk surface of the disk case. Thus it becomes possible to prevent giving damage to the magnetic disk surface.

When the disk case is to be taken out, the inclined portion slides along the sliding hole and besides an upward force acting on the holder works to move the slide piece upwardly. As a result, the disk case can be taken out by operating with a little force.

Also it is desirable that there should be provided, as the frictional mechanism, a sliding piece on one of the holder side and the chassis side and an elastic member for elastically pressing the slide piece on the other side, and that the slide piece should slide on the elastic member when the holder moves towards the second position.

In this case, the slide piece is a plate spring having a V-shaped or curved portion and the forward end of the slide piece is desired to slide at the inclined portion of the curved portion when the holder moves to the second direction, so that the crest of the curved portion contacts the side portion of the slide piece. And it is desirable that upon the completion of movement of the holder to the second position, the crest of the curved portion contact the side of the slide piece.

Furthermore, in the aforementioned case, the slide piece partly contacts the inclined portion formed in a V shape when the holder starts moving from the first direction to the second direction. Furthermore, with the sliding motion of the slide piece on the plate spring, the plate spring expands to slide while the V-shaped crest of the plate spring is in contact with the side of the slide piece. Consequently, the sliding speed of the holder decreases and accordingly the impact occurring at the time of head contact with the disk is lessened, thereby preventing giving a damage to the disk.

Furthermore, when the disk case is taken out, the holder is slid in the reverse direction, thus moving the slide piece along the crest of the plate spring. When the bottom of the slide piece has reached a higher position than the crest, the slide piece is raised by the force of the plate spring. Consequently, the disk case can be taken out simply by applying a little operating force.

The foregoing object and other objects according to the present invention will become more apparent and understandable from the following detailed description thereof, when read in connection with the accompanying drawings.

DESCRIPTION OF THE PREFERRED EMBODIMENTS

Figure 1:
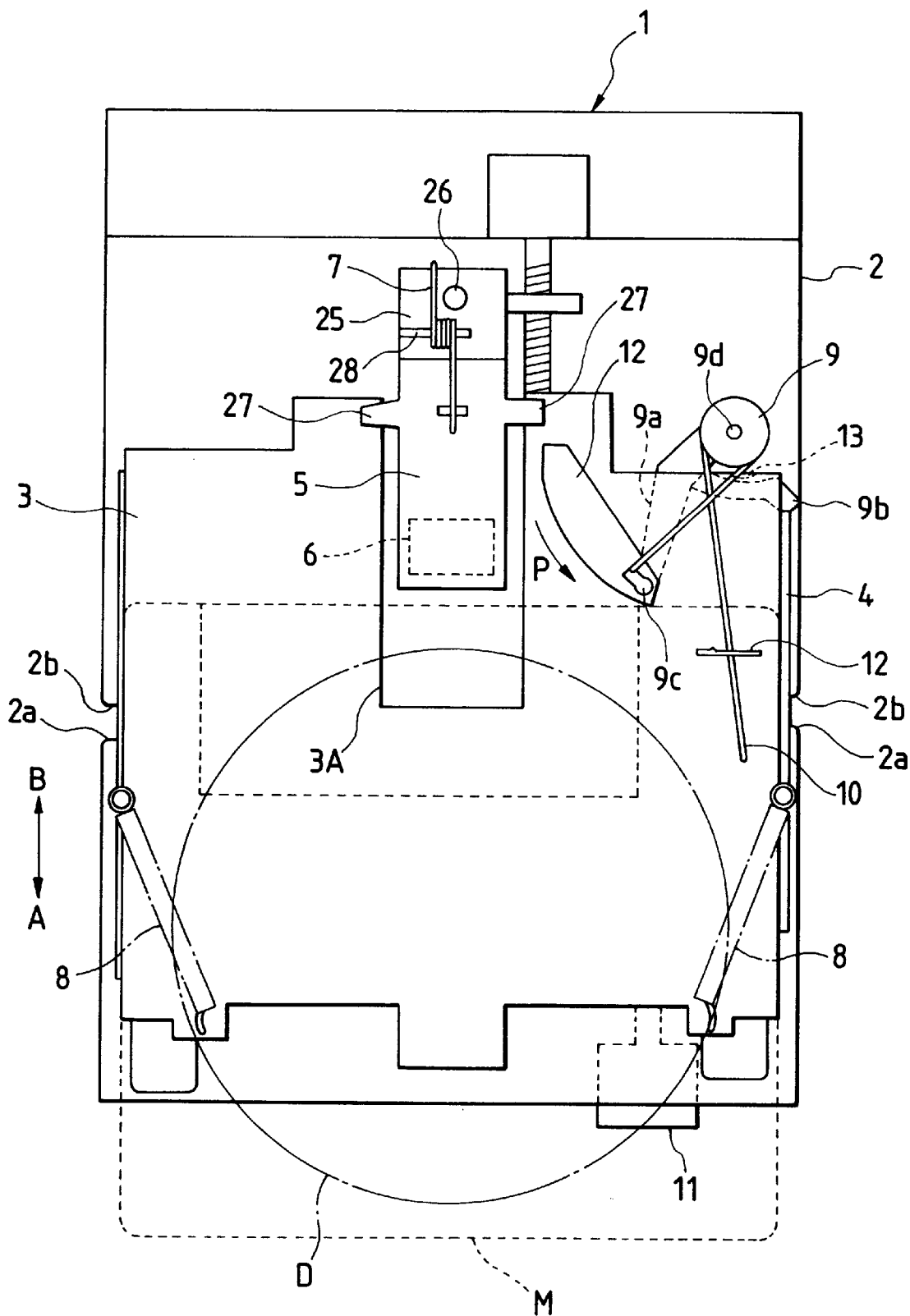
FIG. 1 is a plan view showing the structure of the whole body of a disk device.

A disk device 1 of the present invention has a chassis 2, a holder 3, and a slide plate 4 as shown in FIG. 1. Above the chassis 2 is the slide plate 4 which is formed with both sides bent up, and is movable in the directions A and B in the drawing. Furthermore, within the slide plate 4 is mounted the holder 3 capable of holding a disk case M therein. The disk case M contains a soft magnetic disk D inside and is partly provided with a shutter. When the shutter is opened, the magnetic disk D is partly exposed.

Figure 2:
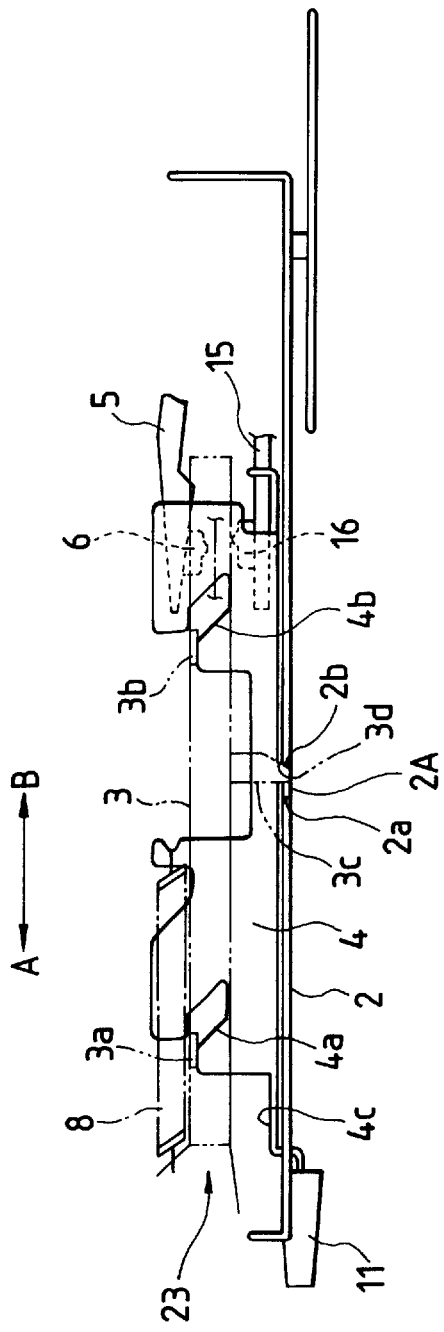
FIG. 2 is a view explaining operation of a holder in the first position.
Figure 4:
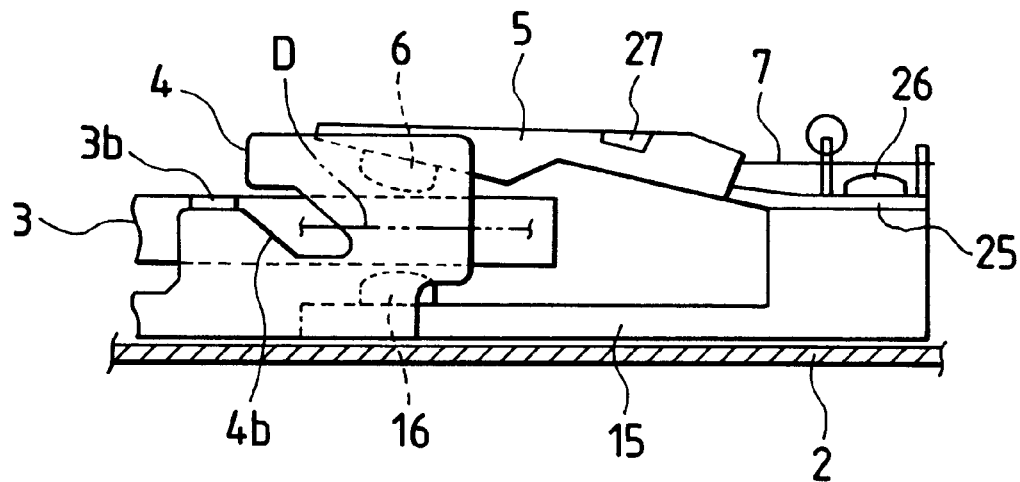
FIG. 4 is a view explaining a relationship of a head position when the holder is in the first position.
Figure 5:
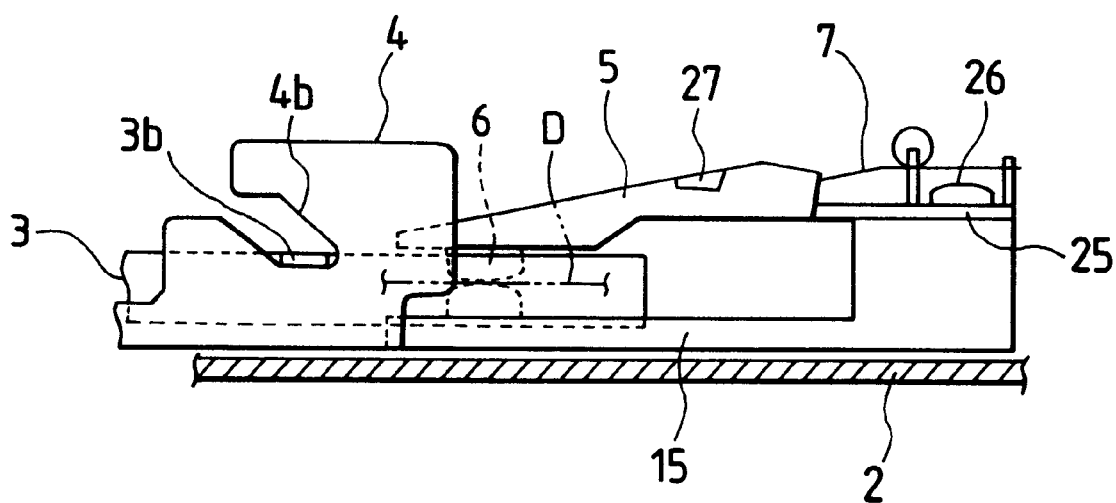
FIG. 5 is a view explaining a relationship of the head position when the holder is in the second position.

In the upper surface of the holder 3, there is formed a recess 3A cut out from the outer side to the inner side of the disk D, so that the head 6 on the side 1 side can move in the radial direction of the disk D within the recess 3A. Furthermore, a semicircular hole 14 is formed on the holder 3. The head 6 is provided on the forward end of the plate-like arm 5, so that the arm 5 will move back and forth in the directions of the arrows A and B in FIG. 1 within the recess 3A. On the opposite side of the head 6, a head 16 on the side 0 side is arranged on an arm 15 as shown in FIG. 2. The arm 5, as shown in FIGS. 4 and 5, is connected at the base end to the plate spring 25, which is attached by a screw 26 on the arm 15. Above the plate spring 25, a torsional coil spring 7 is attached through a stationary portion 28. The arm 5 and the head 6 are constantly pressed towards the disk D by means of the torsional coil spring 7.

The holder 3 and the slide plate 4 are connected by coil springs 8, 8; the slide plate 4 being constantly pushed in the direction A, and the holder 3 also is pushed by the coil springs 8, 8 in the direction B.

On the chassis 2 a rotary part 9 of an approximately bifurcated shape is mounted rotatably on the center of the shaft 9d. Formed on the rotary part 9 are a first leg 9a and a second leg 9b extended from its base end and bifurcated halfway. On the base end a torsional coil spring 10 is attached. One end of the torsional coil spring 10 is attached on the forward end 9c of the first leg 9a which is exposed from the hole 14, while the other end is attached on the stationary portion 12 formed on the holder 3. The first leg 9a side, therefore, is pushed in the direction P. The second leg 9b is engaged with an engagement portion 13 formed integrally with the slide plate 4 as shown in FIG. 1 when no disk case M is inserted. The slide plate 4, therefore, moves in the direction B and locked.

According to the disk device 1 described above, when the disk case M inserted has reached a predetermined position within the holder 3, the shutter provided in the disk case M is caught by the forward end 9c of the first leg 9a, and furthermore the disk case M is further pushed in to turn the rotary part 9 in the opposite direction of the arrow P against the force of the torsional coil spring 10. At the same time, the first leg 9a turns to gradually open the shutter, thereby exposing the magnetic surface of the disk D in the disk case M.

Furthermore, the second leg 9b also turns with the turn of the rotary part 9, thus being disengaged from the engagement portion 13 formed integrally with the slide plate 4. Upon the disengagement of the second leg 9b, the slide plate 4 is pushed in the direction A by the force of the coil springs 8, 8, and accordingly the holder 3 goes downwardly to the chassis 2 until the central part of the magnetic disk D is set in the rotation drive section in the chassis 2. At this time the magnetic disk D in the holder 3 lowers as low as the position in which the head 16 on the side 0 side is located, and furthermore, with the lowering of the holder 3, the head 6 on the side 1 side contacts the magnetic disk D.

In the meantime, when the disk case M is to be taken out, a button 11 is depressed to slide the slide plate 4 back in the direction B. And with the depression of the button to the predetermined position, the holder 3 is raised and the rotary part 9 is turned in the direction of the arrow P by the force of the torsional coil spring 10. Then, the second leg 9b is caught again by the engagement portion 13 to lock the slide plate 4. Also simultaneously with the locking of the second leg 9b by the engagement portion 13, the first leg 9a is also turned in the direction P in the drawing by the force of the torsional coil spring 10 mounted in the rotary part 9, and the disk case M is discharged out of the holder 3 in the direction A by the force of the torsional coil spring 10.

Figure 3:
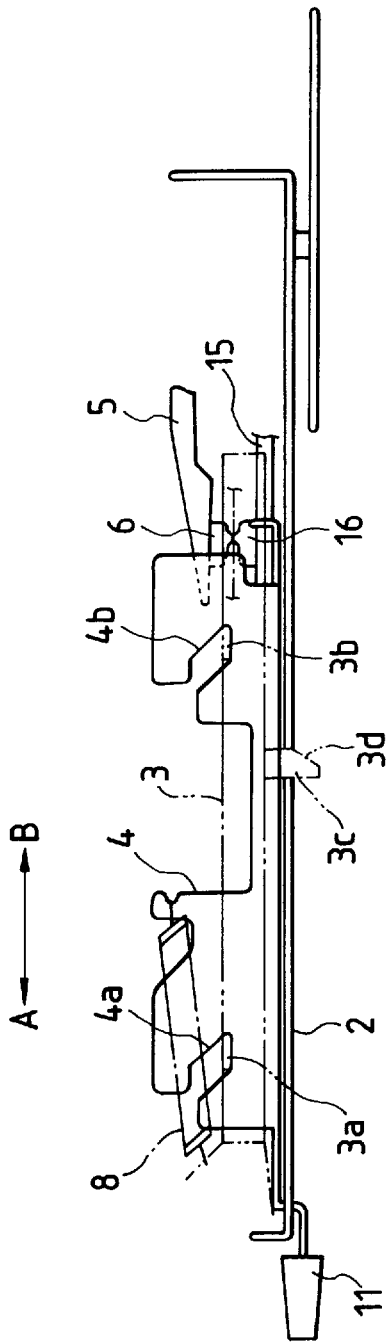
FIG. 3 is a view explaining operation of the holder in the second position.

Next, FIG. 2 and FIG. 3 are side views of the disk device 1 explaining the operation of the disk device 1 viewed from the side.

Figure 6:
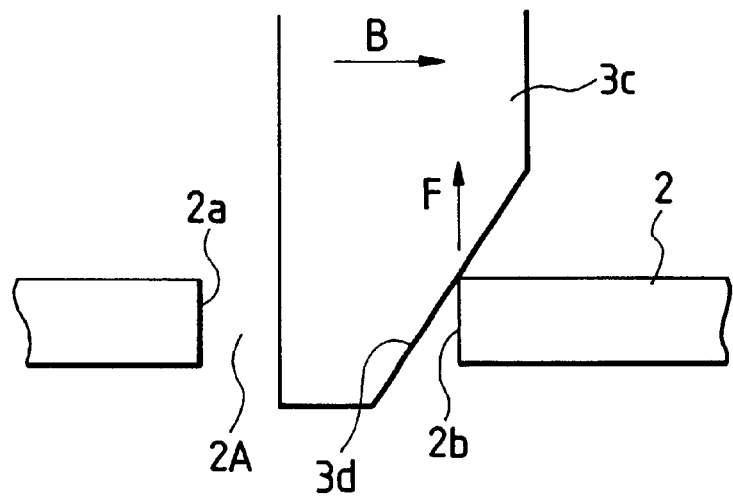
FIG. 6 is a partly enlarged plan view showing the first condition of a slide piece and a chassis.
Figure 7:
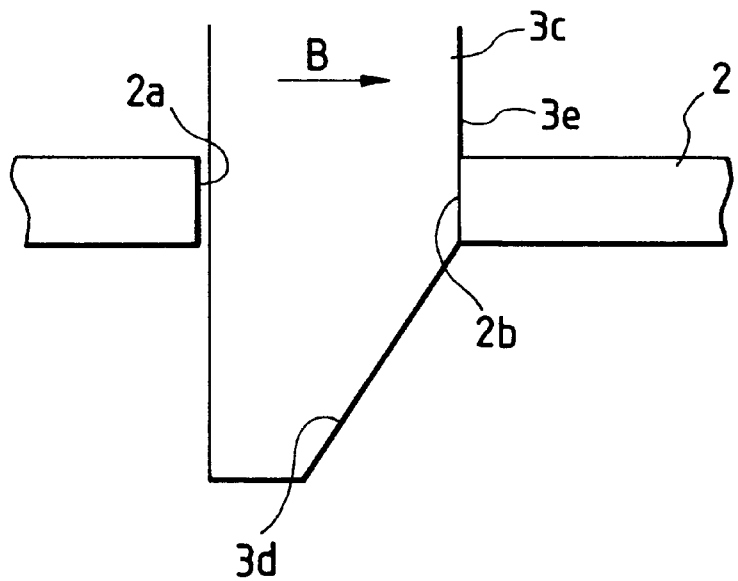
FIG. 7 is a partly enlarged plan view showing the second condition of the slide piece and the chassis.

On the holder 3 used in the disk device 1 of the present invention, a pair of plate-like slide pieces 3c (same also on the opposite side) are protuberantly formed as one body at center of both ends. The slide piece 3c consists of a small tapered member. To be more specific, the slide piece 3c is bent as one body from the holder 3 as shown in FIG. 6, and is provided with a straight portion which faces the edge portion 2a on the A side of the sliding hole 2A formed in the chassis 2. Also the slide piece 3c has the inclined portion 3d on a portion which faces the edge portion 2b (a driven portion) on the B side of the sliding hole 2A. In this case, the inclined portion 3d is set in the direction (direction B) in which the holder 3 is pushed by the coil spring 8, 8. Furthermore, when the holder 3 has reached the down position as shown in FIG. 7, the edge portion 2b of the sliding hole 2A in contact with the inclined portion 3d moves to the flat portion 3e.

On the side face of the holder 3, the slide pieces 3a and 3b (same also on the opposite side) are longitudinally formed in an outward direction. In the side wall surface of the slide place 4 are formed slide grooves 4a and 4b cut out obliquely in the direction B, so that the slide pieces 3a and 3b can slide in the slide grooves 4a and 4b. When no disk case M is inserted, the slide pieces 3a and 3b are awaiting in the upper position, that is, staying on the level portion formed on the open side of the slide grooves 4a and 4b.

FIG. 2 shows the state of the disk device before insertion of the disk D. In this state, the holder 3 is in the upper position, or in the first position.

The disk case M is inserted from the first position into the insertion port 23 of the holder 3. When the disk case M has reached a predetermined position within the holder 3, the second leg 9c of the rotary part 9 is unlocked from the engagement portion 13 and thereafter the slide plate 4 is moved in the direction A by the force of the oil springs 8, 8.

At this time, the slide piece 3c formed on the holder 3 slides up and down within the sliding hole 2A of the chassis 2. The holder 3, therefore, is guided to move only in the up-and-down direction.

As the slide plate 4 is slid in the direction A by the force of the coil springs 8, 8, the holder 3 is supported by the slide grooves 4a and 4b, going downwardly along the inclined surface of the slide grooves 4a and 4b.

FIG. 3 shows the second position of the disk case M that has lowered to the read/write position.

The holder 3, being constantly pushed by the coil springs 8, 8, slides in the direction B as depicted. Therefore, the slide piece 3c formed on the holder 3 slides downwardly while being pushed by the edge portion (a driven portion) 2b on the B side of the sliding hole 2A formed in the chassis 2.

In this case, since the slide piece 3c is of a tapered shape as previously stated, the holder 3 is lowered by the sliding motion of the slide plate upon the disengagement of the rotary part 9 from the engagement portion 13 formed on the slide plate 4, allowing the inclined portion 3d of the slide piece 3c to contact the upper end corner or the edge portion 2b. Then, the inclined portion 3d slides along the edge portion 2b to thereby reduce the lowering speed of the holder 3.

When the inclined portion 3d of the slide piece 3c has come into contact with the upper end corner of the edge portion 2b with the downward motion of the holder 3 as shown in FIGS. 6 and 7, the slide piece 3c (the holder 3) is applied with the force of the coil springs 8, 8 in the direction B; a component force F of a reactive force of the spring force acts upwardly on the inclined portion 3d.

Furthermore, the slide piece 3c slides on the edge portion 2b until the disk case M lowers as low as the read/write position as shown in FIG. 7. At this time, the flat portion 3e is in contact with the edge portion 2b. Because, in the state shown in FIG. 7, the force is working on the slide piece 3c in the direction of the arrow B, the flat portion 3e of the slide piece 3c is pressed against the inner wall of the edge portion 2b.

To draw out the disk case M, the button 11 mounted on the disk device 1 is pushed in.

As shown in FIG. 1 to FIG. 3, the button 11 is mounted on the slide plate 4. Depressing the button 11 slides the slide plate 4 in the direction B. In this case, the holder 3 moves upwardly in the slide grooves 4a and 4b through the slide pieces 3a and 3b, moving to the upper level portion of the slide grooves 4a and 4b. When the holder 3 has slid to reach the upper part of the slide grooves 4a and 4b, the rotary part 9 is turned by the force of the torsional coil spring 10 and at the same time the second leg 9b turns to come to be locked in front of the engagement portion 13. Also at the same time, the first leg 9a is turned (in the direction of the arrow P in FIG. 1) by the force of the torsional coil spring 10, thereby ejecting the disk case M out.

As shown in FIGS. 6 and 7, when the button 11 is depressed to take out the disk case M, the flat portion 3e of the slide piece 3c and the level portion of the edge portion 2b slide a little, and thereafter the slide piece 3c (the holder 3) goes upwardly while sliding at the inclined portion 3d along the corner of an entrance in the upper part of the edge portion 2b.

The inclined portion 3d is formed on the slide piece 3c as previously stated; therefore when the inclined portion 3d has come into engagement with the edge portion 2b, the operator can take out the disk case M simply by applying little force (little resistance force) to the button 11. That is, when the inclined portion 3d of the slide piece 3c has reached the corner of the entrance of the edge portion 2b, an upward force is built up by the movement of the inclined portion 3d to thereby automatically raise the slide piece 3c because a force is constantly working on the slide piece 3c in the direction B.

Next, operation of the heads 6 and 16 of the disk device 1 will be explained.

In the disk device 1, as shown in FIG. 4, the movement of the head 16 on the side 0 side is controlled only in the radial direction of the disk D and therefore is not controlled in the direction of height of the head 16 before the insertion of the disk case M.

The head 6 on the side 1 side is awaiting above the position where the disk case M is inserted in order that the hard case section of the disk case M can be inserted. In this case, the head 6 is constantly pushed by the torsional coil spring 7 towards the disk D. As shown in FIG. 1, projections 27, 27 formed on the arm 5 are caught by the edge portion of the recess 3A in the upper surface of the holder 3, so that the head 6 can await above.

When the disk case M inserted from the position shown in FIG. 4 reaches a predetermined position in the holder 3, the slide pieces 3a and 3b of the holder 3 slide on the slide grooves 4a and 4b of the slide plate 4. At this time, the magnetic disk D in the disk case M slides to the position of the head 16 on the side 0, where the magnetic disk D contacts the head 16. Since the projections 27, 27 formed on the arm 5 are in contact with the upper surface of the holder 3, the head 6 also lowers with the downward movement of the holder 3, with the force of the torsional coil spring 7 being applied to the arm 5 towards the disk D.

The magnetic disk D is so designed as to contact the head 6 on the side 1 side after contacting, on the other side, the head 16 on the side 0 side as shown in FIG. 5.

In the disk device 1 of the present invention, the lowering speed of the holder 3 can be decreased by the slide piece 3c, and accordingly the lowering speed of the head 6 also decreases in interlock with the holder 3. Consequently, an impact occurring when the head 6 contacts the magnetic disk D is reduced, thereby solving such a problem as giving damage to the magnetic disk D.

According to the present invention, because the inclined surface 3d is formed on the slide piece 3c as previously stated, it is possible to take out the magnetic disk D by depressing the button 11 with a less pressure than a conventional disk.

Figure 8:
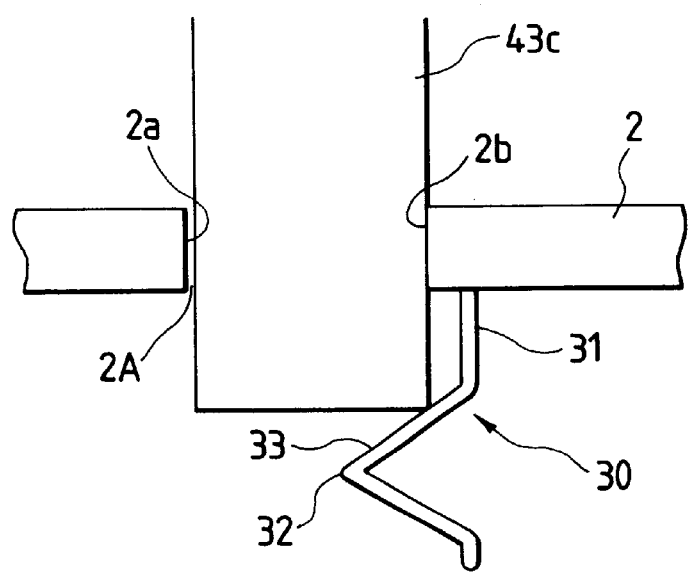
FIG. 8 is a partly enlarged plan view showing the first condition of the slide piece and the chassis in another embodiment.
Figure 9:
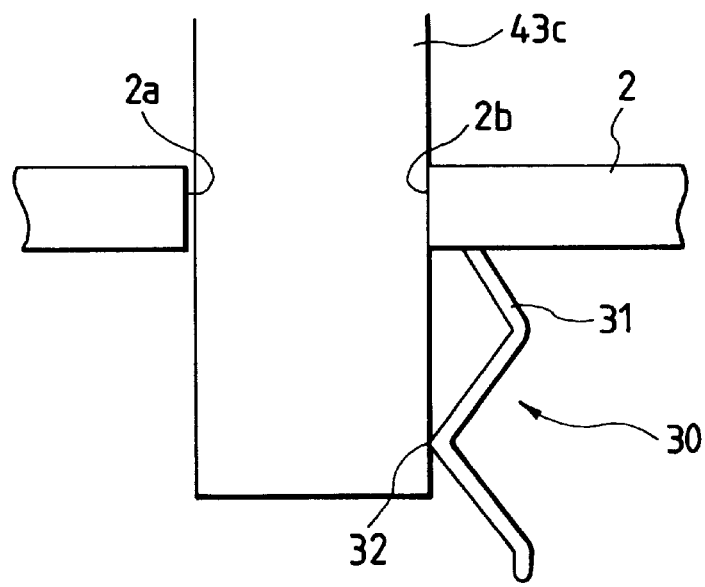
FIG. 9 is a partly enlarged plan view showing the second condition of the slide piece and the chassis in another embodiment.
Figure 10:
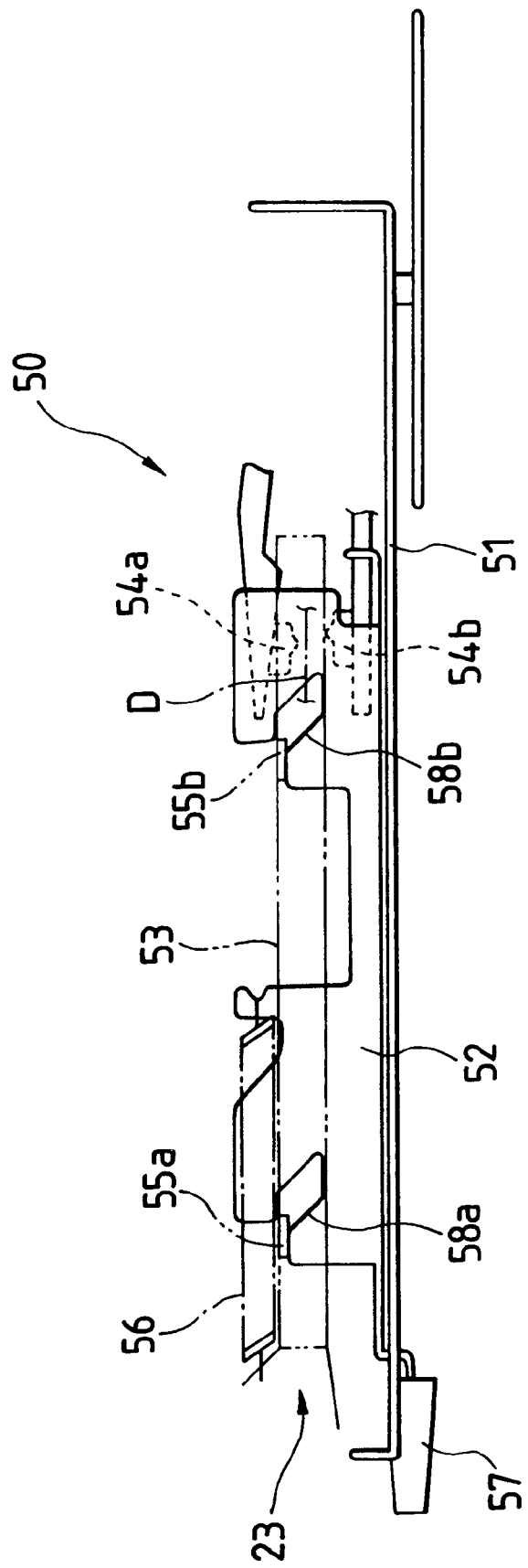
FIG. 10 is a side view showing a conventional disk device.

It is to be noted that the disk device 1 of the present invention is not limited to the aforesaid embodiment and may be of such a type as shown in FIG. 8 and FIG. 9.

As shown in FIGS. 8 and 9, an elastic member 30 is mounted downwardly from the underside of the chassis 2 on one of the edge portions 2a and 2b of the slide hole 2A formed in the chassis 2, that is, on the 2b side in the direction in which the holder 3 is actuated. The elastic member 30 is formed of a plate spring 31 with a V-shaped crest formed in the forward end; the V-shaped crest 32 being so disposed as to face the slide piece 43c side. The upper side of the V-shaped plate spring 31 is formed of the straight inclined surface 33.

When the elastic member 30 is used, the slide piece 43c without the disk case M inserted is in the position shown in FIG. 8 or in a higher position than the position.

With the downward movement of the slide piece 43c, the corner of the bottom surface of the slide piece 43c contacts the inclined surface 33 of the plate spring 31. Furthermore, the slide piece 43c is moved downwardly by the force of the coil springs 8, 8 retained on the holder 3; the plate spring 31, therefore, is extended, thereby allowing the slide piece 43c to lower while elastically pressing the side surface of the slide piece 43c by the crest 32.

In the case the aforesaid elastic member 30 is employed, the head 6 does not directly contact the surface of the magnetic disk D at a high speed, but contacts at a lowered speed; therefore, it is possible to decrease the impact resulting from the contact of the head 6 with the magnetic disk D, and accordingly to prevent giving damage to the disk D.

When the disk case M is to be taken out, an EJECT button 11 is pressed in to raise the slide piece 43c as described above. At this time, the slide piece 43c moves with its side surface sliding along the crest 32 of the plate spring 31. When the bottom of the slide piece 43c has reached the crest 32, a force to recover the original V shape of the plate spring 31 acts towards the slide piece 43c, thereby holding the slide piece 43c upwardly. Consequently, the disk case M can be ejected out with a less force than the force in conventional devices even when the button 11 is depressed to take out the disk case M.

Furthermore, it should be noticed that the disk device of the present invention is not limited to the aforementioned embodiment. The inclined portion 3d of the slide piece 3c described in the first embodiment, for instance, may be formed by further forming an inclined surface starting at the base end side of the slide piece 3c, so that the inclined surface will be in contact with the chassis 2 even when the slide piece 3c is in the lowermost position, thus enabling easy ejection of the disk D with a less force than in the first embodiment.

Furthermore, it should be noticed that there may be employed a damper for pushing the side surface of the slide piece 3c, and also that the plate spring 31 may be changed in shape for example from the straight inclined surface 33 to a curved one.

What is claimed is:

1. A disk device having a chassis, a holder which moves between a first position in which a disk case is received and a second position in which a disk in said disk case received is set to a rotation drive section, a head which contacts said disk when said holder has moved as far as said second position, a pressure member for pressing said holder towards said second position, and an ejection drive member for recovering said holder from said second position to said first position, wherein said disk device is provided, between said holder and said chassis, with a frictional mechanism which increases a load for movement when said holder moves towards the second position, wherein said frictional mechanism comprises a slide piece having a tapered inclined portion on one of said holder and said chassis, and a driven portion on the other of said holder and said chassis along which said slide piece slides, said slide piece and said driven portion configured so that said inclined portion and said driven portion slide against each other when said holder moves towards the second position, and wherein when said holder moves to the second position, said holder is guided in a direction substantially perpendicular to a plane defined by the disk by the sliding of the slide piece against the driven portion.

2. The disk device according to claim 1, wherein the slide piece further comprises a side portion adjacent said inclined portion, said side portion configured to engage the driven portion as said holder moves to the second position, said side portion and said inclined portion providing different loads for movement when said holder moves towards said second position.

3. The disk device according to claim 2, wherein said side portion guides said holder in a direction perpendicular to the plane defined by the disk when said holder moves to said second position.

* * * * *